United States Patent

Gebhard et al.

[11] Patent Number: 5,975,259
[45] Date of Patent: Nov. 2, 1999

[54] ELECTRICALLY PROPELLED VEHICLE

[75] Inventors: Bruno Gebhard, Forchheim; Peter Hofmayer, Baiersdorf; Alfred Kortemeyer, Hilden, all of Germany

[73] Assignee: Siemens AG, Munich, Germany

[21] Appl. No.: 08/952,907
[22] PCT Filed: May 15, 1996
[86] PCT No.: PCT/DE96/00862
  § 371 Date: Mar. 4, 1998
  § 102(e) Date: Mar. 4, 1998
[87] PCT Pub. No.: WO96/37395
  PCT Pub. Date: Nov. 28, 1996

[30] Foreign Application Priority Data

May 24, 1995 [DE] Germany .................. 295 08 707 U

[51] Int. Cl.⁶ .................................................. B61C 17/00
[52] U.S. Cl. .............................. 191/50; 191/66; 191/60.3
[58] Field of Search ............................... 191/50, 55, 56, 191/59, 59.1, 64, 65, 66, 60.3

[56] References Cited

U.S. PATENT DOCUMENTS

| | | |
|---|---|---|
| 1,238,148 | 8/1917 | Kasper ........................... 191/50 |
| 2,339,441 | 1/1944 | Turner ........................... 191/50 |
| 5,115,405 | 5/1992 | Cathala et al. ................. 191/60.3 |
| 5,584,369 | 12/1996 | Makino et al. ................. 191/50 |

FOREIGN PATENT DOCUMENTS

| | | |
|---|---|---|
| 599 031 | 6/1994 | European Pat. Off. . |
| 35 36 843 | 4/1987 | Germany . |
| 92 15 814 | 3/1993 | Germany . |

OTHER PUBLICATIONS

K. Sachs, "Electric Motor Vehicles", A Handbook for practical use and for students, Swiss Electrotechnical Association published by Springer–Verlag, 2d Ed., vol. 2, 1973, pp. 342–352.

*Primary Examiner*—Mark T. Le
*Attorney, Agent, or Firm*—Kenyon & Kenyon

[57] ABSTRACT

In an electrically propelled vehicle having at least one roof container (1) and at least one pantograph (6), such that the roof container (1) contains at least components for electrically protecting the power electronics downstream of the pantograph (6), because the pantograph (6) is mounted in electrically insulated fashion on the roof container (1) there are only short unprotected electrical conduction paths between the pantograph (6) and the components for protecting the power electronics downstream of the pantograph (6).

12 Claims, 3 Drawing Sheets

1

ELECTRICALLY PROPELLED VEHICLE

FIELD OF THE INVENTION

The invention concerns an electrically propelled vehicle having at least one roof container and at least one pantograph.

BACKGROUND INFORMATION

In electrically propelled vehicles such as electrically propelled rail vehicles, the roof container and pantograph are arranged in physically separate fashion. The roof container generally contains components for electrically protecting the traction equipment, the heating system, and the vehicle's power converter. The components for distribution of supply voltage can also be arranged in a roof container of this kind.

In a conventional arrangement, the electrical lines between the pantograph and the roof container extend on the roof. Because they are not electrically protected in this region, the electrical cables must be mechanically shielded by pipes or by cable ducts. Such features are relatively complex. If the insulation is damaged in the case of an electrical cable that is protected in this fashion, this immediately causes a short circuit.

In addition, European Patent No. 0 599 031 describes a roof container in which the housing is constituted by a rectangular floor, two side walls, and two end walls. The housing can be covered by a one-piece cover which covers the entire area of the housing. In order to ensure that the components arranged in the housing are easily accessible from both sides, detachable articulated connections are arranged at the upper edges of both side walls, so that the housing cover can be swung open to either side.

SUMMARY OF THE INVENTION

An object of the present invention is to provide an electrically propelled vehicle which has only short unprotected electrical conduction paths.

The electrically propelled vehicle of the present invention comprises at least one roof container and at least one pantograph, such that the roof container contains at least components for electrically protecting the power electronics downstream of the pantograph. According to the present invention, the pantograph is mounted in electrically insulated fashion on the roof container.

The unprotected electrical conduction paths in the case of the vehicle according to the present invention are minimal, since only the short line segment between the pantograph and the first component for electrically protecting the downstream power electronics is not electrically protected. The electrical cables leaving the roof container, which lead, for example, to a further roof container, therefore no longer require complex mechanical shielding.

DETAILED DESCRIPTION OF THE INVENTION

Figure 1:
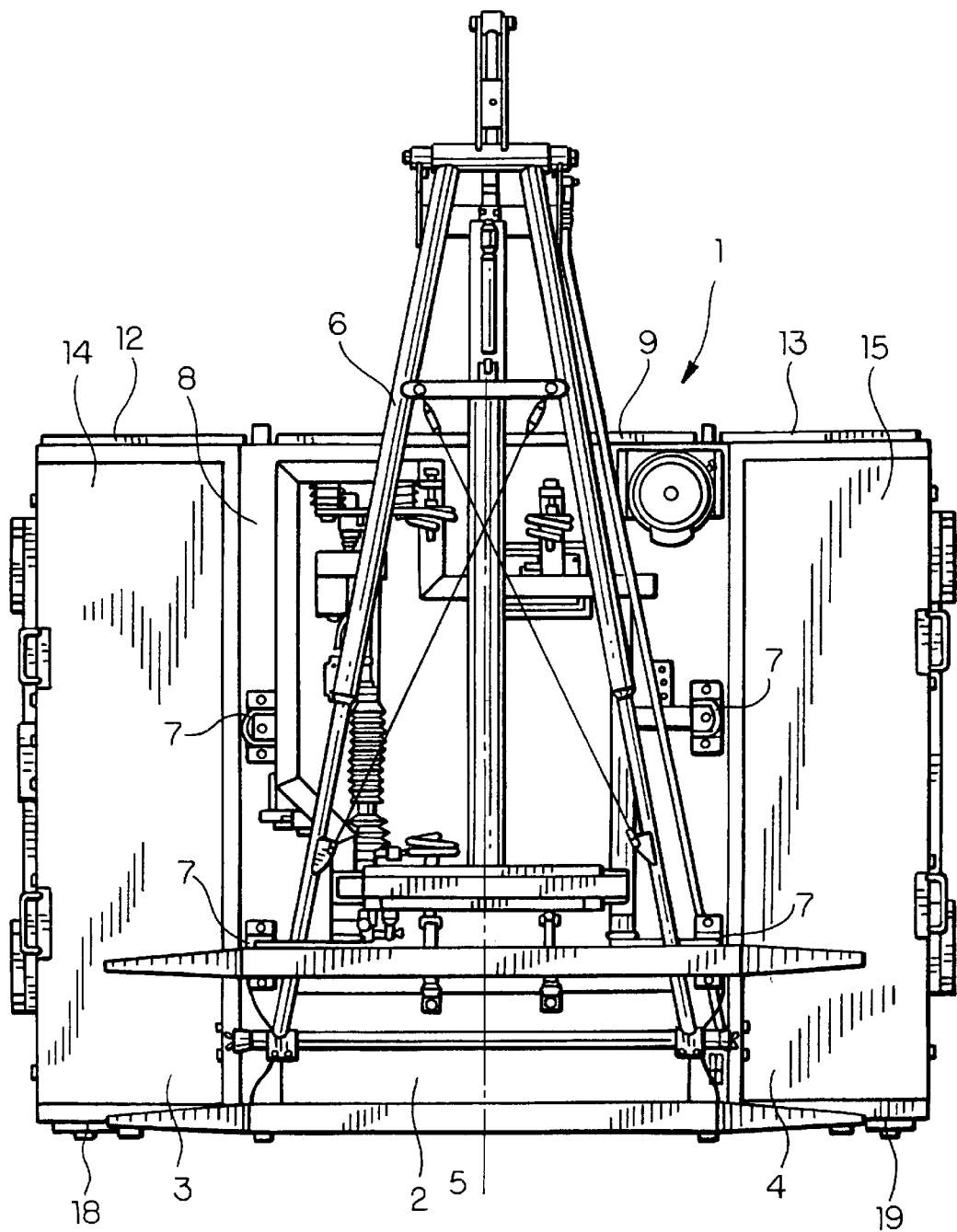
FIG. 1 shows a plan view of a roof container of a rail vehicle according to the present invention.
Figure 2:
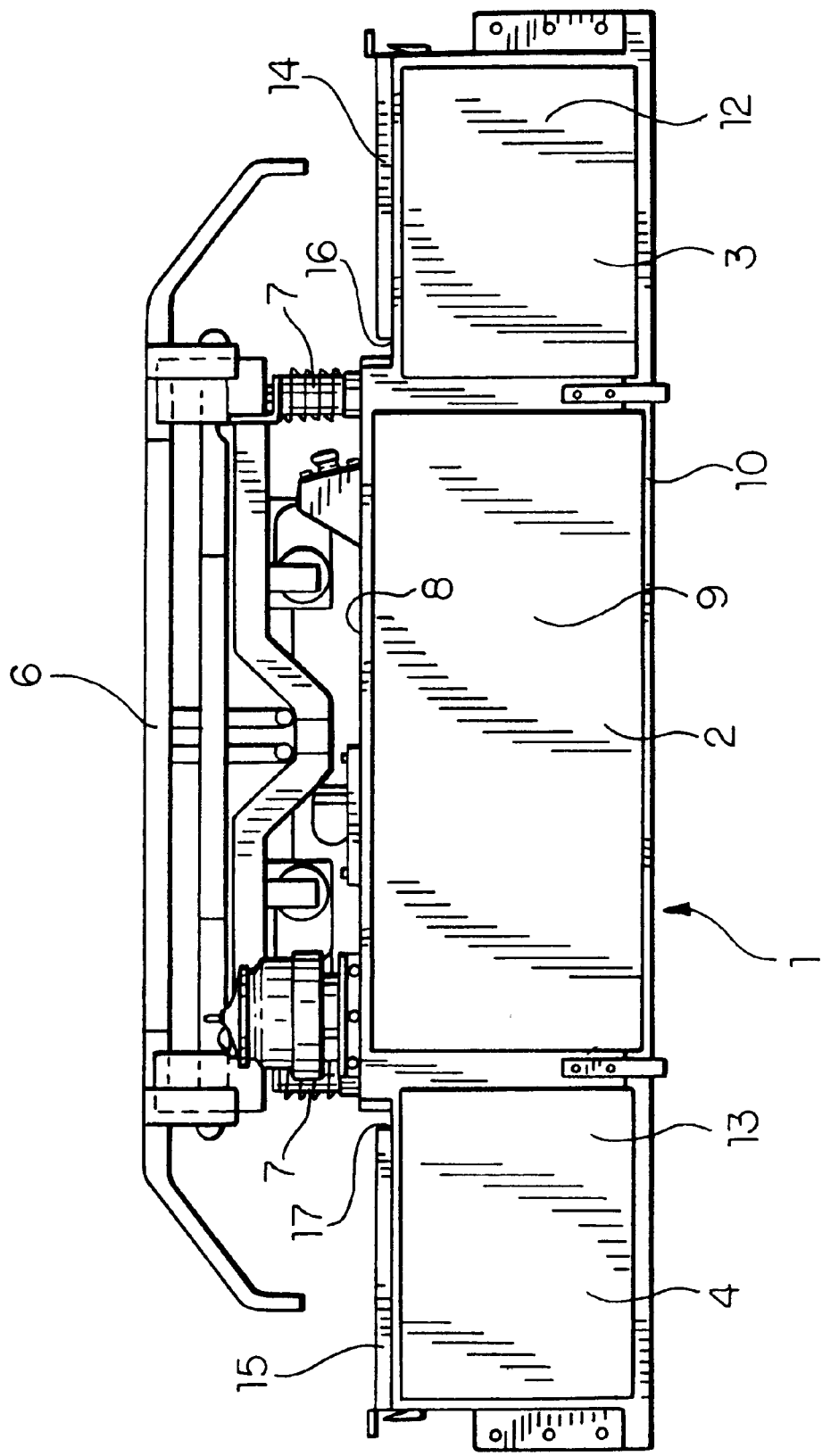
FIG. 2 shows an end view of the roof container shown in FIG. 1.

In FIGS. 1 and 2, 1 designates a roof container which consists, in the exemplifying embodiment depicted, of a center part 2 and two side parts 3 and 4 which run parallel to long axis 5 of center part 2 and thus parallel to the longitudinal axis of the vehicle.

Center part 2 is higher than the two side parts 3 and 4 and carries a pantograph 6, the linkage of which is of substantially the same width as center part 2 of roof container 1. Pantograph 6 is mounted, spaced away by means of insulators 7, on roof 8 of center part 2.

According to the present invention, pantograph 6 is mounted in electrically insulated fashion on roof container 1 minimizes the unprotected electrical conduction paths, since then only the short line segment (not shown in FIGS. 1 to 3) between pantograph 3 and the components for protecting the high-voltage equipment is not electrically protected. Electrical cables leaving roof container 1, both to the drive equipment and to the heating units and the vehicle's power converter, are already electrically protected.

Center part 2 of roof container 1 is closed off, at its end face facing away from the articulated transition, by a cover 9 which is pivotable about a lower axis 10 extending horizontally (FIG. 2).

Side parts 3 and 4 of roof container 1 are each closed off, at their end faces facing away from the articulated transition, by a removable cover 12 and 13 (FIG. 2).

Each side part 3 and 4 of roof container 1 can moreover be closed off by a roof cover 14 and 14. The two roof covers 14 and 15 can be pivoted up about an axis 16 and 17 toward the center of the vehicle.

Covers 9, 12, and 13 arranged on the end faces, and roof covers 14 and 15, guarantee good accessibility to all the components, contained in roof container 1, for protecting and distributing high voltage.

Figure 3:
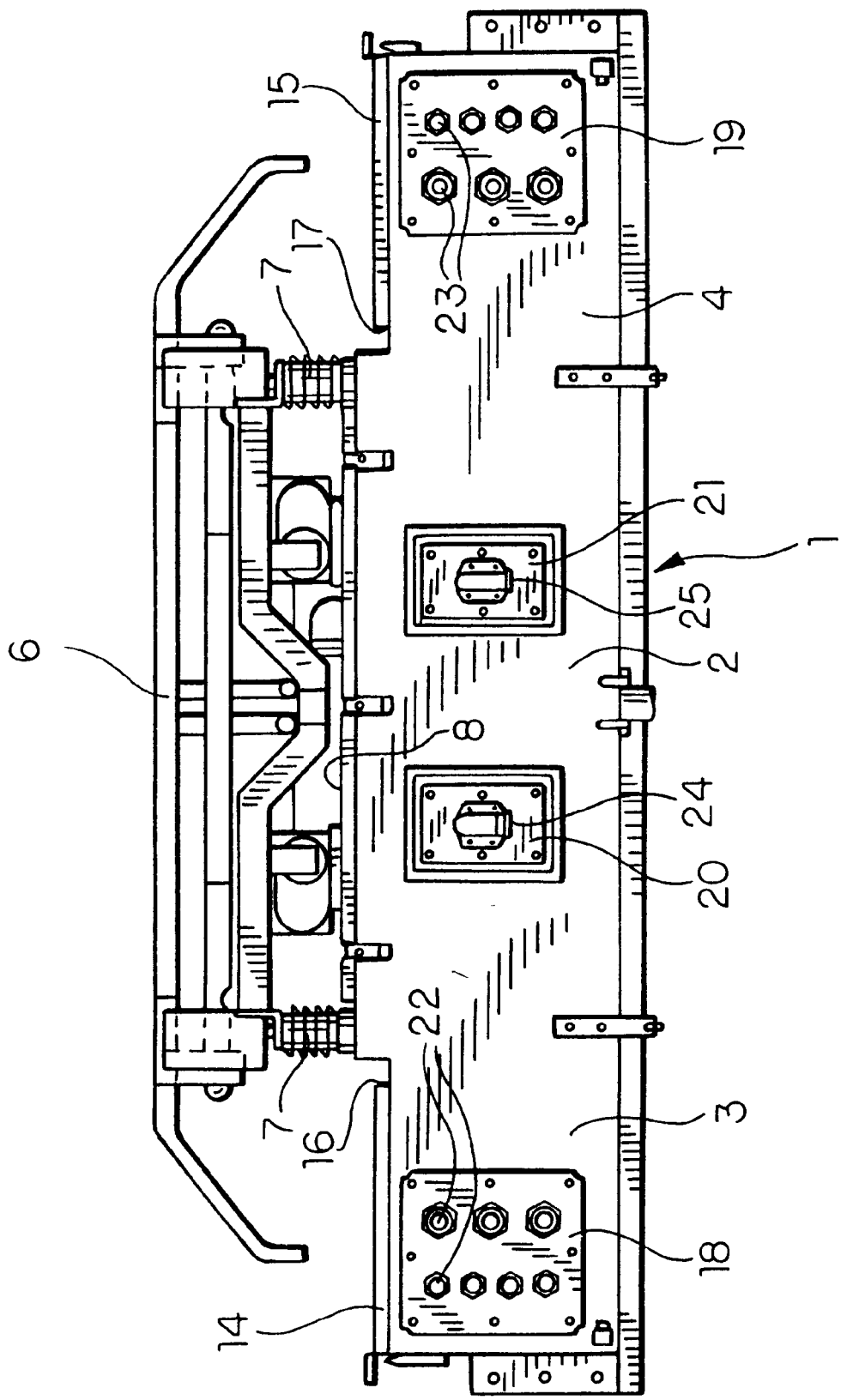
FIG. 3 shows another end view of the roof container shown in FIG. 1.

The openings in-the end face of roof container 1 facing toward the articulated transition are closed off by covers 18 to 21 (FIG. 3).

Covers 18 and 19 have cable leadthroughs 22 and 23 for an articulated clamping point located therebehind, whereas on covers 20 and 21, connection points 24 and 25 are arranged in the articulation region.

What is claimed is:

1. An electrically propelled vehicle, comprising:

a pantograph; and a roof container arranged on a roof of the vehicle;

the roof container containing components for electrically protecting power electronics downstream from the pantograph, the pantograph being mounted on the roof container and being electrically insulated from the roof container.

2. The vehicle according to claim 1, wherein the roof container includes a roof cover, the roof cover being positioned either parallel or perpendicular to a longitudinal axis of the pantograph.

3. The vehicle according to claim 2, wherein the roof cover pivots up toward the center of the vehicle.

4. The vehicle according to claim 2, wherein the roof cover is removable from the roof container.

5. The vehicle according to claim 1, wherein the roof container includes an end face having at least one opening, and a cover covering the at least one opening.

6. The vehicle according to claim 5, wherein the cover pivots about one of a vertical axis and a horizontal axis.

7. The vehicle according to claim 5, wherein the cover is removable from the opening.

8. The vehicle according to claim 1, wherein the roof container includes connections for articulated transitions.

9. The vehicle according to claim 1, wherein the roof container includes connections for electrical lines out of a passenger compartment of the vehicle.

10. The vehicle according to claim 1, wherein the roof container includes connections for electrical lines on the roof of the vehicle.

11. The vehicle according to claim 1, wherein the roof container includes a clamping point on a side facing the roof of the vehicle.

12. The vehicle according to claim 1, wherein the pantograph is mounted on an outside portion of the roof container.

* * * * *